(12) United States Patent
Pell et al.

(10) Patent No.: US 8,938,562 B2
(45) Date of Patent: Jan. 20, 2015

(54) METHOD OF, AND APPARATUS FOR, MITIGATING MEMORY BANDWIDTH LIMITATIONS WHEN PERFORMING NUMERICAL CALCULATIONS

(75) Inventors: Oliver Pell, London (GB); Stephen Girdlestone, London (GB)

(73) Assignee: Maxeler Technologies, Ltd., London (GB)

( * ) Notice: Subject to any disclaimer, the term of this patent is extended or adjusted under 35 U.S.C. 154(b) by 1193 days.

(21) Appl. No.: 12/823,432

(22) Filed: Jun. 25, 2010

(65) Prior Publication Data

US 2011/0320768 A1    Dec. 29, 2011

(51) Int. Cl.
  *G06F 13/12*   (2006.01)
  *G06F 15/16*   (2006.01)
  *G06F 12/16*   (2006.01)
  *G06F 15/00*   (2006.01)

(52) U.S. Cl.
  CPC ............... *G06F 12/16* (2013.01); *G06F 15/00* (2013.01)
  USPC ............................................. 710/68; 712/30

(58) Field of Classification Search
  CPC ......................................................... G07F 17/16
  USPC .......................................................... 710/68
  See application file for complete search history.

(56) References Cited

U.S. PATENT DOCUMENTS

| | | | | |
|---|---|---|---|---|
| 5,548,798 | A * | 8/1996 | King | 710/68 |
| 7,707,433 | B2 * | 4/2010 | Rice et al. | 713/194 |
| 7,742,900 | B1 * | 6/2010 | Canning | 703/2 |
| 8,281,056 | B2 * | 10/2012 | Ergas et al. | 710/68 |
| 2010/0082509 | A1 * | 4/2010 | Mishev et al. | 706/14 |
| 2011/0010409 | A1 * | 1/2011 | Delaquil et al. | 708/446 |

* cited by examiner

*Primary Examiner* — Titus Wong
(74) *Attorney, Agent, or Firm* — Conley Rose, P.C.

(57) ABSTRACT

There is provided a method of, and apparatus for, processing a computation on a computing device comprising at least one processor and a memory, the method comprising: storing, in said memory, plural copies of a set of data, each copy of said set of data having a different compression ratio and/or compression scheme; selecting a copy of said set of data; and performing, on a processor, a computation using said selected copy of said set of data. By providing such a method, different compression ratios and/or compression schemes can be selected as appropriate. For example, if high precision is required in a computation, a copy of the set of data can be chosen which has a low compression ratio at the expense of processing time and memory transfer time. In the alternative, if low precision is acceptable, then the speed benefits of a high compression ratio and/or lossy compression scheme may be utilised.

37 Claims, 7 Drawing Sheets

METHOD OF, AND APPARATUS FOR, MITIGATING MEMORY BANDWIDTH LIMITATIONS WHEN PERFORMING NUMERICAL CALCULATIONS

STATEMENT REGARDING FEDERALLY SPONSORED RESEARCH OR DEVELOPMENT

Not applicable.

BACKGROUND OF THE INVENTION

1. Field of Invention

In general, the invention relates a method of, and apparatus for, processing a computation on a computing device. More particularly, the invention relates to a method of, and apparatus for, mitigating memory bandwidth limitations when performing numerical calculations.

2. Background of Technology

Computer systems are often used to perform complex numerical calculations. One important area in which they are used is in the modelling of real-world conditions and environments; for example, the modelling of: weather systems, fluid propagating through a medium, the motion of stars in a galaxy, an explosive device, or seismic wave propagation.

Often, computer programs are run which create in the computer memory a multi-dimensional "mesh" of the area or region to be modelled. Commonly, techniques such as finite element analysis (FEM) and finite difference modelling (FDM) are used to model real-world environments.

Many modelling systems require linear systems to be solved. Linear systems comprise a set of linear equations involving the same set of variables. For example, equation 1) below outlines two simple linear equations:

$$x+y=2$$
$$2x-y=1 \quad \quad 1)$$

The solution to which is x=1 and y=1.

Generally, such linear systems can be represented using a matrix and two vectors, with the matrix hold the coefficients of the equations, one vector holding the unknowns (in this case, x and y), and the other vector holding the right hand side of the equations. For example, the previous example in equation 1) would be represented as shown in equation 2) below:

$$\begin{pmatrix} 1 & 1 \\ 2 & -1 \end{pmatrix} \begin{pmatrix} x \\ y \end{pmatrix} = \begin{pmatrix} 2 \\ 1 \end{pmatrix} \quad \quad 2)$$

This is commonly described using the form shown below in equation 3):

$$Ax=b \quad \quad 3)$$

Where A is the matrix, x is a vector representing the unknowns, and b is the desired result vector. This system can now be solved using a solver to determine the value of the vector x (the unknown to be calculated) using a variety of algorithms.

A common type of linear system is one where the matrix is sparse (known as a sparse linear system). In a sparse matrix, most of the elements in the matrix are zero. For example, equation 4) illustrates a typical small sparse matrix:

$$\begin{pmatrix} 1 & 0 & 0 & -1 \\ 0 & 2 & 0 & 0 \\ -2 & 0 & 3 & 0 \\ 0 & 0 & 0 & 4 \end{pmatrix} \quad \quad 4)$$

Sparse linear systems often arise from the numerical solution of differential equations such as those which arise during FEM and/or FDM approaches.

The two main classes of solver are direct and iterative solvers. Direct (or exact) solvers generally involve manipulating a matrix into a more easily solvable form such as, for example, a diagonal matrix. In contrast, iterative solvers generally start with an initial guess for the solution of x and then repeatedly perform a process to refine that guess towards an acceptable solution.

Iterative solvers repeatedly refine a "guess" x* for the solution, then perform a matrix-vector multiplication Ax* to compute the result b*. The residual between b* and the desired result b indicates how close the current "guess" is to the true solution x. Once the residual b*-b reaches some required tolerance value, the process can terminate.

One approach to the iterative solving of linear systems is the conjugate gradient method. The conjugate gradient method is an algorithm for the numerical solution of linear systems whose matrix is symmetric and positive definite.

The conjugate gradient method is known for solving large sparse systems, as it is much more efficient than most other solvers for this type of system. Sparse systems often arise when numerically solving partial differential equations (arising from FEM, for example).

In order to determine an appropriate estimated error (which is done to provide an indication of how close the calculation is to the actual solved value of x), an initial guess for the actual solution x* is made. This is $x_0$. If no good initial guess is readily available $x_0=0$ may be used. Starting with $x_0$ for the solution, in each iteration a metric is required to determine whether the iteration is approaching the (currently unknown) solution x*. This metric comes from the fact that the solution x* is also the unique minimizer of a quadratic function.

In the conjugate gradient method, the "pseudo code" (i.e. the computer program flow) can now be written as:

$$
\begin{aligned}
&r_0 = b - Ax_0 \\
&p_0 = r_0 \\
&\lambda_0 = r_0 \cdot r_0 \\
&\text{for } i = 1{:}n \\
&\quad c_i = Ap_i \\
&\quad \beta_i = p_i \cdot c_i \\
&\quad \alpha_i = \lambda_{i-1} / \beta_i \\
&\quad x_i = x_{i-1} + \alpha_i p_i \\
&\quad r_i = r_{i-1} - \alpha_i c_i \\
&\quad \lambda_i = r_{i-1} \cdot r_{i-1} \\
&\quad p_i = r_{i-1} + \lambda_i / \lambda_{i-1} p_{i-1} \\
&\quad \text{if err}(r_{i-1}) < \text{tol/ then exit loop} \\
&\text{end}
\end{aligned}
\quad 5)
$$

where r is the residual vector. p and λ are functions of r.

The disadvantage for iterative solvers is that although each iteration requires relatively little computational resource, generally at least one matrix vector multiplication is required per iteration. For large systems, many iterations are typically required (typically hundreds to tens of thousands) to converge to a usable solution. Consequently, acceleration of this computation can lead to significant reductions in the time required to converge to an acceptable solution.

One approach to increase the speed of a computer system for specialist computing applications is to use additional or specialist hardware accelerators. These hardware accelerators increase the computing power available and concomitantly reduce the time required to perform the calculations.

A suitable system for performing iterative calculations is a stream processing accelerator having a dedicated local memory. The accelerator may be, for example, located on an add-in card which is connected to the computer via a bus such as Peripheral Component Interconnect Express (PCI-E).

The bulk of the numerical calculations can then be handled by the specialised accelerator. Stream processor accelerators can be implemented using, for example, Field-Programmable Gate Arrays (FPGAs), Application Specific Integrated Circuits (ASICs) and/or structured ASICs. Stream processors implemented as FPGAs generally provide much more computational power than a CPU and so are able to perform calculations more quickly than a CPU. In certain cases, such arrangement may increase the performance of highly parallel applications by over an order of magnitude or more.

For some computational applications, the size of the matrix used may be very large and often high precision matrices and vectors are required to obtain reasonable accuracy in the final solution. In some examples, a matrix may comprise $2\times10^7$ columns and $2\times10^7$ rows, leading to up to $4\times10^{14}$ high precision data values which need to be inputted from/outputted to the accelerator local memory. For sparse matrices, many values are zero and do not need to be stored explicitly. However large sparse matrices may still consist of many gigabytes of data.

As a result, the volume of data required to be processed during a step of a calculation may be very large. Therefore, for data-intensive calculations, memory bandwidth may become the bottleneck in a step of an iterative calculation. This is particularly true for stream processors, where the upper limit on the speed of a linear system solver algorithm may be imposed by the bandwidth limitations between the stream processor and the local memory, rather than the speed at which the stream processor can perform calculations.

One approach to alleviate the above issue is to compress the data. In general, compression refers to methods which reduce the physical size of the data set. A number of different compression schemes are available. One scheme may be to reduce the precision of data values in a data set from double precision (which gives around 15 decimal places of precision) to single precision (which gives about 7 decimal digits of precision). Other compression schemes may include block coding, transform based methods such as wavelet or discrete cosine and predictive methods. These may be optionally combined with run-length encoding, Huffman coding or other forms of entropy coding.

However, in many cases, compressed data must be decompressed before it can be used in a numerical calculation. Therefore, in certain circumstances and for some processor architectures (such as, for example, a CPU architecture), the use of compressed data may actually lead to an increased computation time because of the need to perform a decompression operation. In other words, the computational cost of decompressing the compressed data on the CPU would outweigh any benefits of the reduced data volume.

In contrast, the highly parallel, pipelined, wide bus nature of an FPGA/stream processor accelerator can be used to perform high speed decompression of data with little or no speed penalty. Consequently, compression schemes to reduce the data volume in an iterative calculation are practicable for stream processor architectures and can lead to significant improvements in the speed at which calculations can be performed.

However, scientific data is typically compressed with "lossy" compression schemes which result in the compressed data being merely an approximation to the original data set. Therefore, a technical problem with the utilisation of compressed data is that iteratively solving a linear system using a compressed set of input data will lead to a solution to the linear system which is close to, but not the same as, the solution of the original uncompressed matrix. Therefore, the solution obtained using the compressed input data may only be considered approximate and may not be sufficiently accurate for many applications.

As an example, for an iterative solver to converge to within a given error tolerance, say within an error of $1\times10^{-7}$ of the true solution, both the vectors and the matrix need to have at least enough precision to represent such a solution. Generally, double precision (which gives around 15 decimal places of precision) would be used when solving for error tolerances in the range $1\times10^{-7}$ to $1\times10^{-10}$ in software. Therefore, known compression systems may be unsuitable for such calculations.

It is known to utilise compressed data in computations. For example, US2010/0030932 relates to a method of obviating a bottleneck caused by the relatively slow transfer of data between a host computer and a peripheral processing device, by using data compression and decompression. The peripheral device is configured to decompress the data, process it, and compress the output before returning the output of a given algorithm.

"Pipelined mixed precision algorithms on FPGAs for fast and accurate PDE solvers from low precision components", Robert Strzodka and Dominik Göddeke, IEEE Symposium on Field-Programmable Custom Computing Machines (FCCM 2006), pages 259-268, April 2006 relates to the application of mixed precision methods for the conjugate gradient method. Different levels of precision are used for different parts of the algorithm, depending on where extra precision will lead to increased accuracy of the final solution.

The algorithm is split into a computationally intensive inner loop that runs in low precision, and an outer loop running in higher precision. The arrangement described in this document is directed towards reducing the silicon space required on an FPGA for computation.

An alternative technique for handling matrices is the multigrid method. Multigrid methods are a class of methods that use a sequence of related matrices with different sizes. Various different size representations of the same problem are used during the solve computation exploiting the fact that smaller size matrices can be solved faster, both because fewer operations are required per iteration and also because fewer iterations are required to converge to a solution.

The most common method is to perform a sequence of so called V-cycles, where one or more iterations are performed with the largest matrix, then the next largest and so on until the smallest matrix has been utilised. Then the process works back up again performing iterations on matrices getting gradually larger until the original matrix is used once again. Many V-cycles may be required to reach the solution. However, these methods require several different matrices which have to be computed and processed, and so may be inefficient to process.

To date, known numerical computation methods and associated hardware have suffered from the technical problem that memory bandwidth is the limiting factor in the acceleration of iterative linear solvers which are able to solve a linear system to a high degree of accuracy.

BRIEF SUMMARY OF THE PREFERRED EMBODIMENTS

According to a first aspect of an embodiment of the invention, there is provided a method of processing a computation on a computing device comprising at least one processor and a memory, the method comprising: storing, in said memory, plural copies of a set of data, each copy of said set of data having a different compression ratio and/or compression schemes; selecting a copy of said set of data; and performing, on a processor, a computation using said selected copy of said set of data.

By providing such a method, different compression ratios and/or compression schemes can be selected as appropriate. For example, if high precision is required in a computation, a copy of the set of data can be chosen which has a low compression ratio at the expense of memory transfer time. In the alternative, if low precision is acceptable, then the speed benefits of a high compression ratio and/or lossy compression scheme may be utilised.

In one embodiment, said computation is an iterative calculation and the method further comprises, subsequent to said performing; repeating the steps of selecting and performing for further steps of said iterative calculation.

By providing such a method, the compression ratio and/or compression scheme of the data set can be selected as required for each step of an iterative calculation. If using a highly compressed data set still allows the algorithm to take a step in the correct direction, then the precision of the data set is unimportant. In general, an iterative solver only requires a high precision representation of the data set for the later iterations of the algorithm. Therefore, the initial steps of the iteration can be completed quickly using a highly compressed data set, and the larger, more precise, compressed copies of the data set used later when more accuracy is required.

In one embodiment, said copy of said set of data is selected in dependence upon the compression ratio of said copy.

In one variation, said copy of said set of data is selected in dependence upon the estimated error in said step of the iterative calculation.

In a further variation, said selecting comprises comparing the estimated error in said step of the iterative calculation with an error threshold for each copy of the set of data stored in said memory.

In a further variation, said selecting further comprises selecting a copy of the set of data having an error threshold which is less than or equal to the estimated error in said step of the iterative calculation.

In one approach, said error threshold for each copy of the set of data is a function of the compression ratio and/or the compression scheme of said copy.

In another embodiment, the method further comprises, prior to said performing, decompressing said data on a processor.

In one approach, said computing device comprises a central processing unit and a further processor, said step of decompressing being performed by said further processor.

In a further approach, said further processor is a stream processor and said memory is local to said stream processor.

In one arrangement, said stream processor comprises an FPGA.

In one embodiment, the method further comprises, prior to said storing, generating, from an original set of data, said plural copies of said data.

In one approach, said original set of data is an uncompressed set of data.

In a further approach, said computing device comprises a central processing unit and a further processor, said step of generating being carried out by said central processing unit.

In another approach, said set of data comprises a matrix.

In another approach, said iterative calculation is a linear system solver.

In an embodiment, said computing device comprises a central processing unit and a stream processor, said memory being local to said stream processor and said step of performing being carried out by said stream processor.

According to a second aspect of an embodiment of the invention, there is provided a computing device comprising: at least one processor operable to perform a computation on a set of data values and a memory operable to store said data values, wherein plural copies of said set of data are stored in said memory, each copy of the set of data having a different compression ratio and/or compression scheme, said processor being further operable to select a copy of the set of data for performing said computations.

In one arrangement, said computation is an iterative calculation and the or each processor is further operable to repeat the steps of selecting and performing for further steps of said iterative calculation.

In another arrangement, the or each processor is further operable to select said copy of said set of data in dependence upon the compression ratio of said copy.

In one embodiment, the or each processor is further operable to select said copy of said set of data in dependence upon the estimated error in said step of the iterative calculation.

In another embodiment, the or each processor is further operable to select said copy of said set of data by comparing the estimated error in said step of the iterative calculation with an error threshold for each copy of the set of data stored in said memory.

In one arrangement, the or each processor is further operable to select said copy of said set of data by selecting a copy of the set of data having an error threshold which is less than or equal to the estimated error in said step of the iterative calculation.

In another arrangement, said error threshold for each copy of the set of data is a function of the compression ratio of said copy.

In one arrangement, the computing device comprises a central processing unit and a further processor, said central processing unit being operable to generate said plural copies of said data.

In another arrangement, the or each processor is further operable to decompress said data prior to performing said calculation.

In a further arrangement, said computing device comprises a central processing unit and a further processor operable to decompress said data.

In further arrangement, said further processor is a stream processor and said memory is local to said stream processor.

In a variation, said stream processor comprises an FPGA.

In an another variation, said computing device comprises a central processing unit and a stream processor operable to perform said computation, said memory being local to said stream processor.

In a further arrangement, the processor is further operable to generate, from an original set of data, said plural copies of said data.

In one embodiment, said original set of data is an uncompressed set of data.

In another embodiment, said set of data comprises a matrix.

In another embodiment, said iterative calculation is a linear system solver.

According to a third aspect of an embodiment of the invention, there is provided a method of processing a computation on a computing device comprising at least one processor and a memory, the method comprising: storing, in said memory, plural copies of a set of data, each copy of said set of data having a different compression ratio and/or compression scheme; and performing, on a processor, a computation using one copy of said set of data.

In one embodiment, said computation is an iterative calculation and the method further comprises, subsequent to said performing; repeating the step of performing for further steps of said iterative calculation.

In another embodiment, the method further comprises switching to a different copy of said set of data after a predetermined number of steps.

In a further embodiment, said switching comprises switching to a copy of the set of data having a lower compression ratio and/or lower data loss.

According to a fourth aspect of an embodiment of the invention, there is provided a computing device comprising: a processor operable to perform a computation on a set of data values and a memory operable to store said data values, wherein plural copies of said set of data are stored in said memory, each copy of the set of data having a different compression ratio, said processor being further operable to use one copy of the set of data for performing said computations.

In one arrangement, said computation is an iterative calculation and the processor is further operable to repeat the steps of selecting and performing for further steps of said iterative calculation.

In another embodiment, the processor is further operable to switch to a different copy of said set of data after a predetermined number of steps.

In a further embodiment, said switching comprises switching to a copy of the set of data having a lower compression ratio and/or lower data loss.

According to a fifth aspect of an embodiment of the invention, there is provided a computer program product executable by a programmable processing apparatus, comprising one or more software portions for performing the steps of the first and/or third aspects.

According to a sixth aspect of an embodiment of the invention, there is provided a computer usable storage medium having a computer program product according to the fifth aspect stored thereon.

BRIEF DESCRIPTION OF DRAWINGS

Embodiments of the invention will now be described in detail with reference to the accompanying drawings, in which.

DETAILED DESCRIPTION

Figure 1:
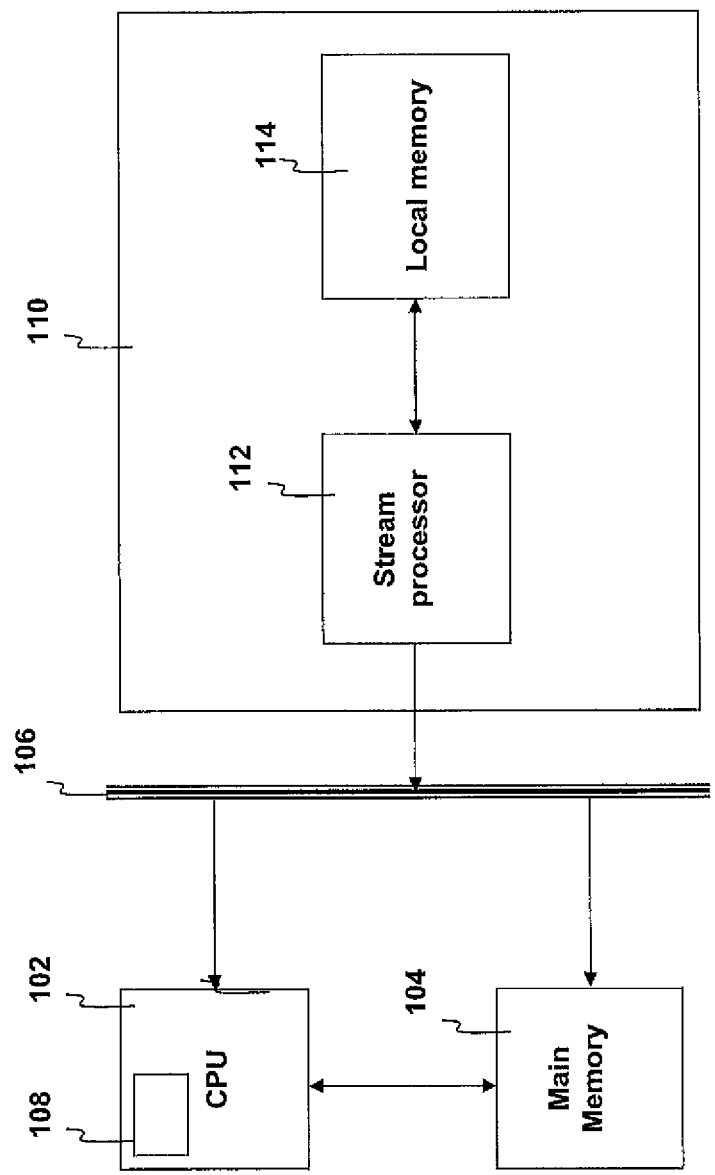
FIG. 1 is a schematic diagram of a computing device including an accelerator card.

FIG. 1 shows a schematic view of a computing device 100. The computing device 100 comprises a Central Processing Unit (CPU) 102, a main memory 104 and a data bus 106.

The CPU 102 may take any suitable form and comprises a processor for carrying out the instructions of a computer program run on the computing device 100. The CPU 100 is the primary element carrying out the functions of the computing device 100 as is well known in the art. The CPU 102 is commonly located on a motherboard (not shown) which comprises the necessary contacts to supply the CPU 102 with power and to connect the CPU 102 to other components in the computing device 100.

The CPU 102 further comprises a cache 108. The cache 108 is an area of local memory which is available to the CPU 102 for processing of data. The cache 108 generally comprises Random Access Memory (RAM). Generally, the cache RAM takes the form of Static RAM (SRAM) in which bits of data are stored in the state of a flip-flop. The cache 108 may be split into a plurality of levels. Since the cache 108 is local to the CPU 102, input/output (I/O) operations to the cache 108 from the CPU 102 are very fast.

The main memory 104 is associated with the CPU 102 and comprises an area of RAM. The RAM may take the form of SRAM, Dynamic RAM (DRAM) in which bits of data are stored as a charge in a capacitor or transistor gate, or any other suitable memory type. As is common for many computing applications, the main memory 104 may be provided as a plurality of SRAM or DRAM modules. These modules can quickly be replaced should they become damaged or when greater storage capacity is required. The main memory 104 is able to communicate with the CPU 102 via the motherboard forming part of the computing device 100.

The data bus 106 enables additional devices to be connected to the computing device 100 and to communicate with components of the computing device 100. The data bus 106 may take any suitable form, for example a Peripheral Component Interconnect Express (PCI-E) data bus. The data bus 106 acts as a motherboard-level interconnect to link motherboard-mounted peripherals and as an expansion card interface for add-in cards.

In this embodiment, the computing device 100 further comprises an accelerator card 110. The accelerator card 110 is configured to connect to the data bus 106 and may be, for example, a PCI-E format expansion board comprising interconnects suitable for connecting to a PCI-E data bus.

Whilst, for clarity, only a single accelerator card 110 is included in the following example, it would be readily apparent to the skilled person that additional accelerator cards may be included to provide additional computational power. For example, four accelerator cards may be included in parallel or series within one system, with each card communicating to the CPU 102 and to each other.

The accelerator card 110 comprises a stream processor 112 and a local memory 114. The local memory 114 is configured for fast access by the stream processor 112 and may comprise simple flip-flops or more complete blocks of memory such as Embedded Block RAM memory.

Figure 2:
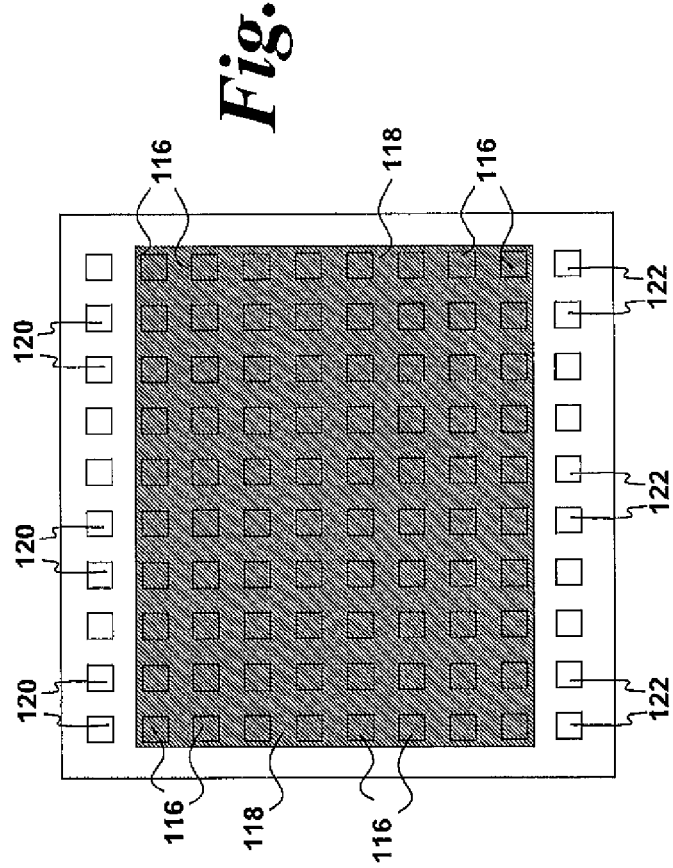
FIG. 2 is a schematic diagram of an FPGA stream processor forming part of the accelerator card of FIG. 1.

In this embodiment, the stream processor 112 comprises an FPGA-based processor. Different types of FPGA processors may be used; however the larger and more arithmetic function-rich FPGAs are more desirable. FIG. 2 shows a schematic diagram of a stream processor 112 in the form of an FPGA. Recent research work has shown that FPGAs can provide a customized solution for specific applications and can achieve an increase in speed of more than two orders of magnitude compared to a single core software implementation.

The FPGA stream processor 112 is an integrated circuit which is configurable after manufacture. The FPGA stream processor 112 comprises a programmable semiconductor device which comprises a matrix of configurable logic blocks (CLBs) 116 connected via programmable reconfigurable interconnects 118 (shown here as the shaded area in FIG. 2). The configuration of the FPGA interconnects 118 are usually specified using a hardware description language (HDL). The HDL is generally similar to that used for an application-specific integrated circuit (ASIC). In order to get data into and out of the FPGA stream processor 112, a plurality of input pads 120 and output pads 122 are provided.

Figure 3:
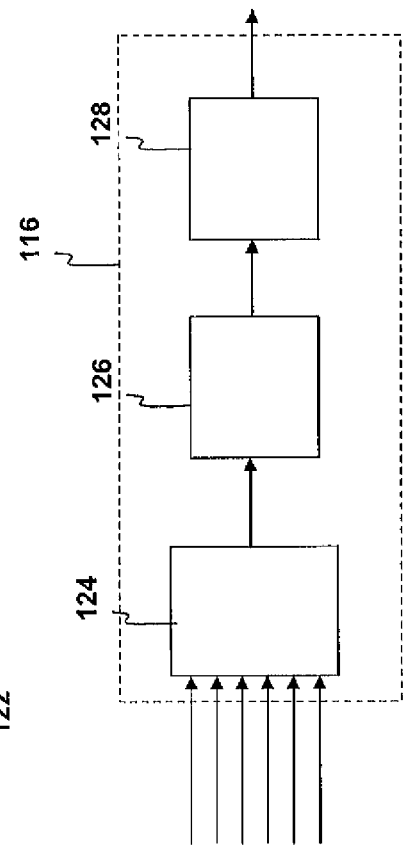
FIG. 3 is a schematic diagram showing a programmable logic block forming part of the FPGA stream processor of FIG. 2.

The CLBs 116 are the basic logic unit of the FPGA 112. A schematic diagram of a typical CLB 116 is shown in FIG. 3. The CLB 116 comprises a configurable switch matrix comprising typically a 4 or 6 input look up table (LUT) 124, some specialist circuitry (such as, for example, a multiplexer), one or more flip-flop units 126 which act as temporary memory storage and an output 128.

The switch matrix of each CLB 116 can be configured to perform a variety of functions; for example, logic gates such as NAND and XOR, or more complex functions. A typical FPGA may comprise up to $10^5$ LUTs. The CLBs 116 are able to operate in parallel, providing a powerful resource for numerically-intense calculations.

FPGA-based processors comprise calculation functions mapped into circuit units along the path from input to output. The FPGA then performs the computation by streaming the data items through the circuit units. The streaming architecture makes efficient utilization of the computation device, as every part of the circuit is performing an operation on one corresponding data item in the data stream at any point during the calculation.

Figure 4:
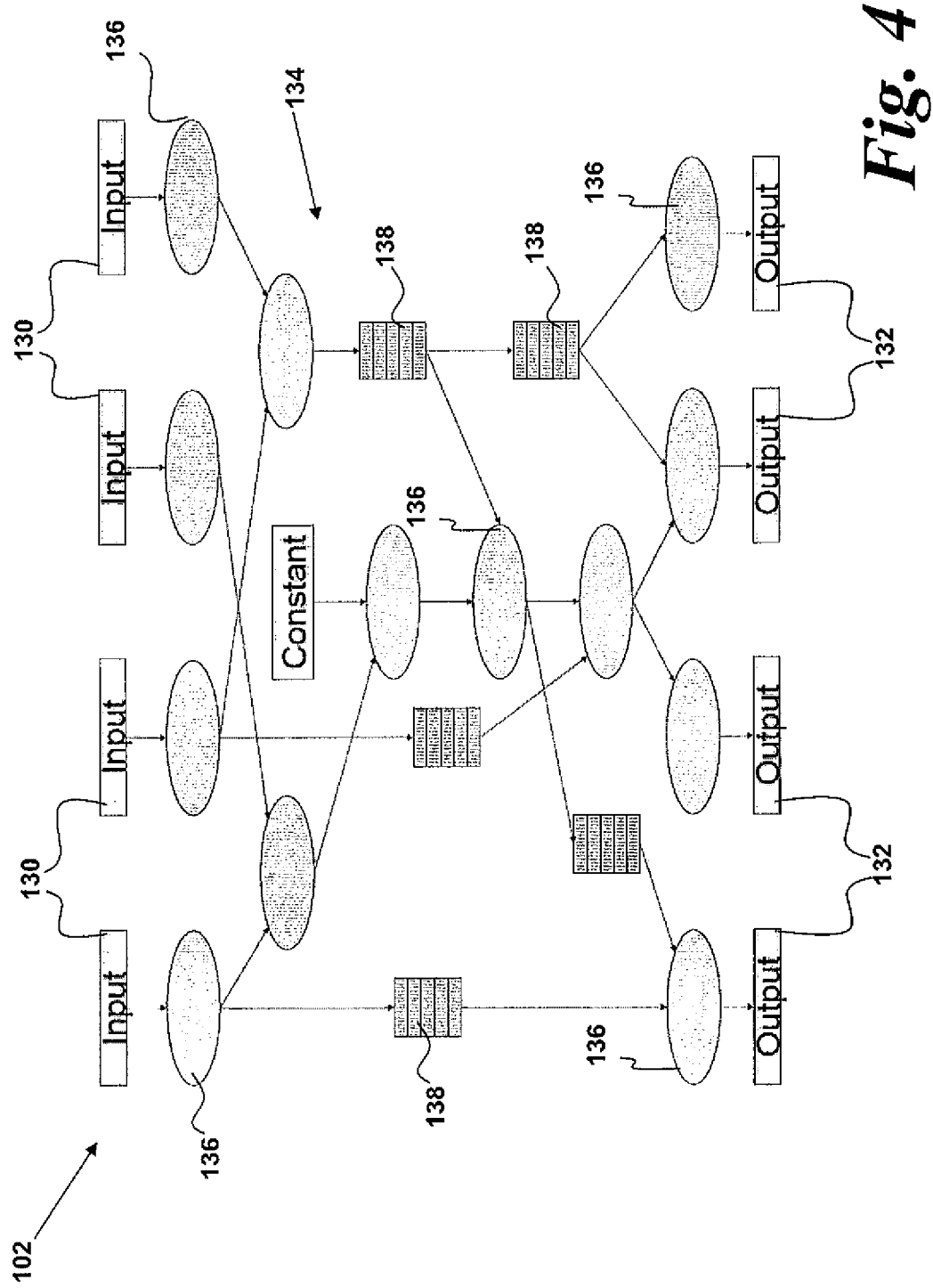
FIG. 4 is a schematic diagram of the computation structure of the FPGA stream processor of FIG. 1.

FIG. 4 shows an example of such a streaming architecture created using the CLBs 116 of the FPGA stream processor 112. FIG. 4 shows a 4 input 130-*i*, 4 output 132 stream computing engine implemented on the stream processor 112.

Between the inputs 130 and the outputs 132 is provided a computational datapath 134. The computational datapath 134 is implemented in the CLBs 116 and comprise arithmetic operations 136 (performed in one or more LUTs 124) and buffer memories 138. As shown, the computational datapath 134 is arranged to process data in parallel.

In operation, the data is streamed through the CLBs 116 of the FPGA stream processor 112 and the arithmetic operations 136 are carried out on the data as it is streamed. This is in contrast to conventional processors in which instructions are generally processed sequentially, although some limited parallelism may possible on some processors. Data is saved to cache during this process and movement of data is directed by the program operating on the CPU.

An embodiment of the method of an embodiment of the invention will now be described with reference to an FPGA-type stream processor 112 accelerator as described above. However, the skilled person would be aware of alternatives, for example, a CPU or other processor with a suitable local memory.

Figure 5:
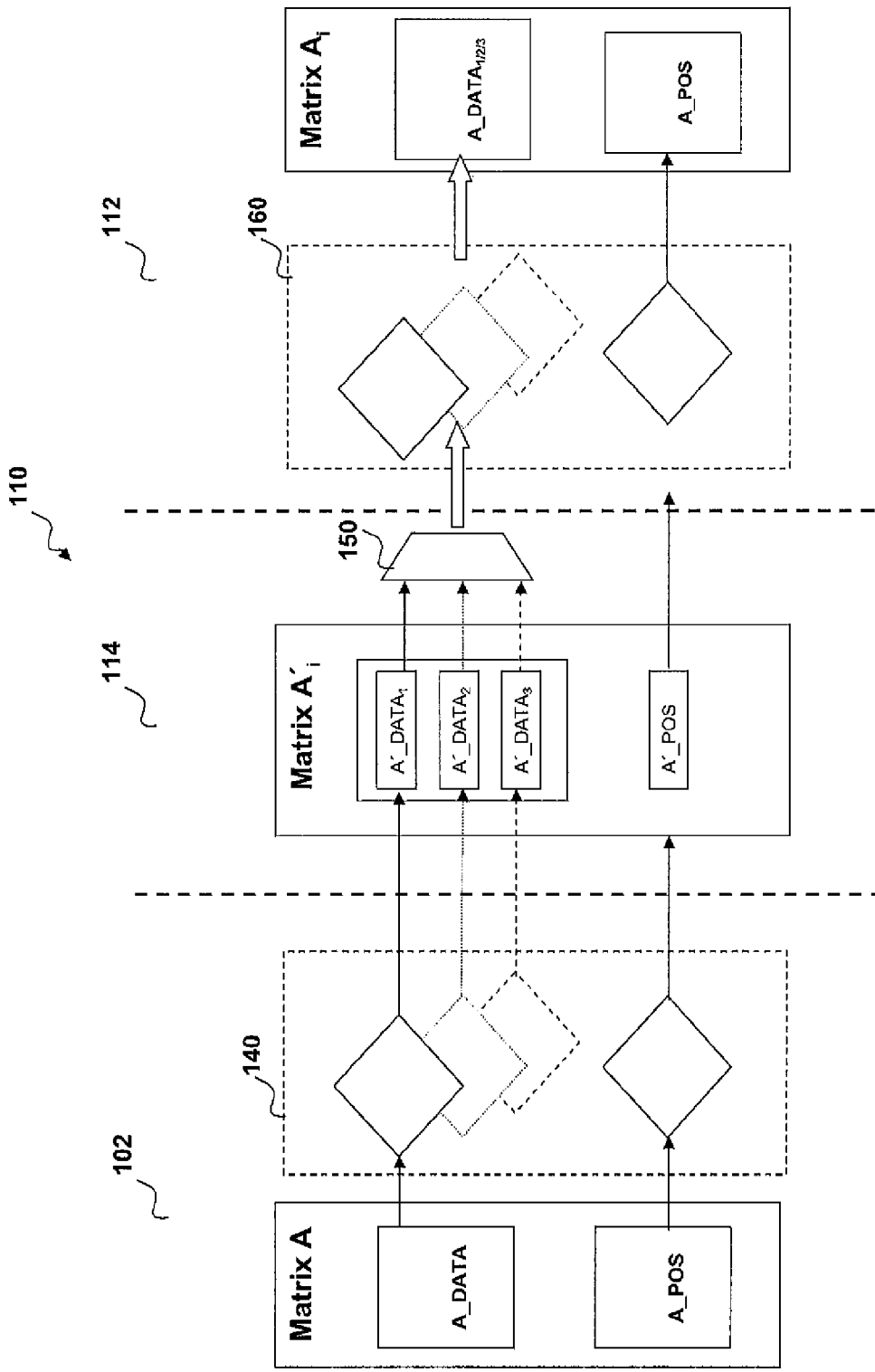
FIG. 5 is a schematic showing the compression and decompression of data in the computing device of FIG. 1.
Figure 6:
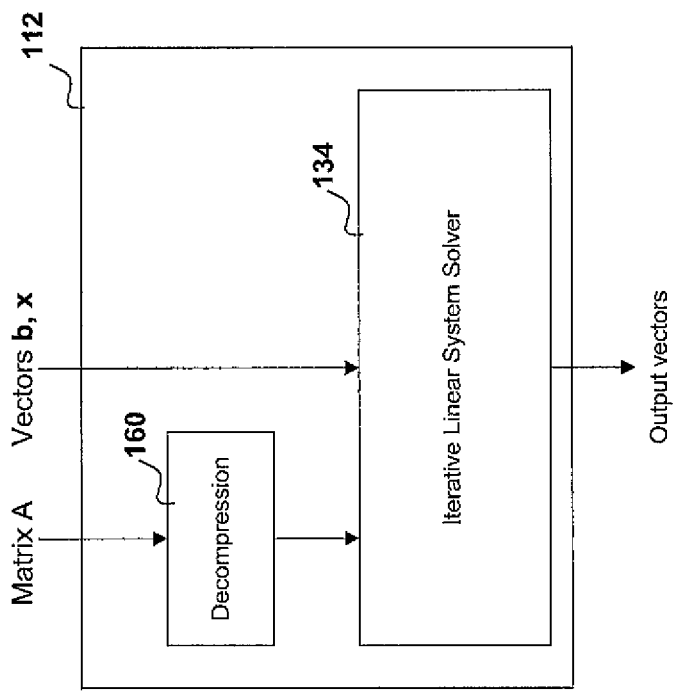
FIG. 6 is a schematic diagram of the components of the stream processor of FIG. 1.

An embodiment of the invention will now be described with reference to FIGS. 5 and 6. FIG. 5 is a schematic illustration of the handling of a matrix within the computer system 100. FIG. 6 shows a schematic diagram of the components within the stream processor 112 illustrated as functional blocks.

In the linear system to be solved, the components comprise the matrix A, the right-hand-side vector b, and the unknown vector x. Therefore, the system to be solved can be expressed as Ax=b.

The matrix A is initially loaded into the main memory 104 for use by the CPU 102. The original, uncompressed matrix A is required for calculation of various error parameters which will be used in the iterative calculation. These will be described later.

The matrix A is a sparse matrix. Sparse matrices are often stored using the Compressed Row Storage (CRS) format. In this format, only the non-zero data in the matrix is stored. The position data corresponding to the position of the non-zero data in the matrix (i.e., the row and column of each non-zero value) is also stored. Since matrices arising from finite element approximations are built up from small element matrices, such matrices usually have data appearing in blocks.

As shown in FIG. 6, the matrix A stored in the main memory 104 comprises non-zero value data A_DATA and position data A_POS.

The value data A_DATA in the uncompressed matrix A is in double precision floating point format. Double precision is a binary format that occupies 64 bits (8 bytes) and its mantissa has a precision of 53 bits (about 16 decimal digits). Therefore, any integer with absolute value less than or equal to $2^{53}$ can be exactly represented in the double precision format.

For certain computational methods, for example finite element methods, the size of the matrix A may be very large. For example, the number of rows and columns may each exceed a million, leading to an extremely large number of data values. Even with the CRS format, the number of data values A_DATA may be typically 60-6000 million. Since the data can be streamed through the stream processor 112 relatively quickly, for data-intensive calculations involving such a large matrix A, the available memory bandwidth of the local memory 114 becomes the bottleneck in a step of the iterative calculation.

It is possible to use compression of the data in the matrix. Compressed matrices have a smaller data volume (and so consume less of the bandwidth of the local memory 114). Therefore, compression of the matrix A can lead to significant reductions in the volume of data which needs to be written to and read from the local memory 114. Consequently, the more heavily compressed the matrix A, the faster the iterative computation can be run.

However, the data volume of the matrix A is considerably larger than that of either of the two vectors x and b. Therefore, due to their relatively smaller data volume, there is little benefit in applying compression to the vector elements, and so the vector values x and b are passed directly to the computational datapath 134 without any modification to the data values as shown in FIG. 6.

The non-zero data A_DATA comprises floating point values and so can only be usefully compressed using lossy compression methods. Whilst lossless compression methods may be used in some cases, the achieved compression ratio would not be sufficiently useful.

Data compressed using lossy techniques is merely an approximation to the original data set. Therefore, lossy compression of the value data A_DATA will, by definition, reduce the precision of the values within the matrix A.

Consequently, if a matrix compressed using lossy compression is used to solve a particular linear system, the solution to that system found using the compressed matrix will be a solution close to, but not be the same as, one obtained with the full double precision matrix. However, the solution found using the compressed matrix will be a nearby solution to the solution using the uncompressed double precision matrix.

Iterative linear solvers converge on a solution gradually over a number of iterations. Therefore, if the difference between the intermediate result (which has not yet converged to a solution) from a particular iteration and the actual solution computed with the double precision matrix is greater than the difference between the actual solution computed with the double precision matrix and the actual solution computed with a compressed matrix, then the compressed matrix can be used for that particular iteration. This is because the errors in the solution introduced by the compression of the matrix are relatively small in comparison to the difference between the intermediate result for that particular iteration of the solve and the actual solution computed with the double precision matrix.

Therefore, for example, an iterative calculation using a highly compressed matrix may only converge towards the actual final solution for 200 steps of the iterative calculation. However, it may take 400 steps of the iteration using the original (uncompressed) matrix to converge to a solution that satisfies a given error tolerance. Consequently, the highly compressed matrix could be used for the first 200 iterations and then the computation could switch to a less compressed (or even uncompressed) copy of the matrix for the final 200 iterations. This would enable the first 200 steps of the iterative calculation to be run much faster than would otherwise be possible, without increasing the total number of iterations required.

Based on the error bounds required for the iterative calculation, in this embodiment the CPU 102 is operable to calculate three separate compressed copies of the matrix A using a compression unit 140 (see FIG. 5). It is to be understood that the compression unit 140 may simply form part of the CPU 102 or be a software component running on the CPU 102 and that the compression unit 140 is referred as a single entity here for clarity purposes.

The CPU 102 is operable calculate three separate compressed copies of the matrix A which have low, medium and high data loss, i.e. the three copies have high, medium and low compression ratios respectively. The three copies of the original, uncompressed set of data A_DATA are $A'\_DATA_1$, $A'\_DATA_2$ and $A'\_DATA_3$. $A'\_DATA_1$ has the highest compression ratio (and thus the smallest data volume and the highest data loss) and $A'\_DATA_3$ having the lowest compression ratio (and thus the largest data volume and the least data loss).

Any suitable compression technique may be used; i.e. any technique which reduces the volume of the data in a data set. Further, different compression techniques may be used for each copy of the original matrix. Additionally, more straightforward compression techniques may be used; for example, by simply reducing the data values in the matrix A from double precision to single precision data values. Single precision is a binary format that occupies 32 bits (4 bytes) and its mantissa has a precision of 24 bits (about 7 decimal digits). This provides a useful saving in data size when compared to double precision data values (which are 64 bits in size).

Three separate compressed matrix copies $A'_1$, $A'_2$ and $A'_3$ of the original, uncompressed matrix A are used in this embodiment to provide a trade-off between the time required for the CPU 102 to compute the compressed matrices and the computational benefits of utilising a greater number of compressed matrices. However, the skilled person would be readily aware that other compression ratios, compression schemes or number of compressed copies of the original set of data could be used.

In contrast to the value data A_DATA, the position data A_POS must remain accurate, even after compression. Therefore, the position data A_POS can only be compressed with lossless compression and so the amount of compression which can be done on this data without generating errors is limited. The position data A_POS is compressed losslessly by the CPU 102 to give compressed position data A'_POS. For the position data (A_POS) possible compression schemes may be block coding, run-length encoding, Huffman coding or another form of entropy coding.

Once the matrix A has been compressed by the CPU 102, the compressed matrix data can then be streamed to the local memory 114 of the accelerator card 110. The three compressed copies of the original, uncompressed value data A_DATA, $A'\_DATA_1$, $A'\_DATA_2$ and $A'\_DATA_3$, are stored in the local memory 114 for independent access by the stream processor 112 during the computation.

During the iterative computation, a selection unit 150 selects the desired copy of the set of data values $A'\_DATA_1$, $A'\_DATA_2$ or $A'\_DATA_3$ in dependence upon the estimated error in a particular step of the iterative calculation (i.e. the estimated difference between the current solution during the iteration and the final solution). The selection unit 150 may form part of the stream processor 112 or a part of other hardware on the accelerator card 110. Alternatively, the selection unit 150 may be located remote from the accelerator card 110 or may form a part of the CPU 102.

The desired copy of the matrix $A'_i$ (where i=1, 2 or 3 depending upon the selection made) which is selected by the selection unit 150 is streamed into the stream processor 112 and then decompressed by a decompression unit 160 forming part of the stream processor 112 before a step of the iterative calculation is performed. On an FPGA stream processor 112, there is sufficient computing power to perform decompression as well as the conventional computation. Consequently, use of the FPGA stream processor architecture enables the decompression unit 160 to be provided and to perform decompression without any negative impact on the calculation run-time. This is achieved simply by providing larger on-chip area to implement the decompression unit 160.

The decompression unit 160 is shown in FIG. 6 as separate from the computational datapath 134. However, in some embodiments it may comprise a part of the computational datapath 134 which is dedicated to decompression. However, other alternatives may be implemented; for example, the decompression unit 160 may comprise a separate component on the accelerator card 110 or may be located elsewhere on stream processor 112.

The compressed position data A'_POS is also decompressed by the decompression unit 160 to retrieve the original position data A_POS (since the position data is compressed without loss).

The stream processor 112 is operable to perform the iterative calculation by streaming the data through the computational datapath 134 of the stream processor 112 using the decompressed matrix $A_1$, $A_2$ or $A_3$ (depending upon the selected compressed data copy) resulting from the decompression of the compressed data by the decompression unit

160. Once the data has passed through the computational datapath 134, an intermediate result is obtained. If more steps of the iteration are required, then the stream processor 112 is further operable to decompress the compressed matrix data and stream the matrix data $A_1$, $A_2$ or $A_3$ (depending upon the selection made by the selection unit 150) together with the vector data, through the computational datapath 134 to perform a further step of the iteration.

Figure 7:
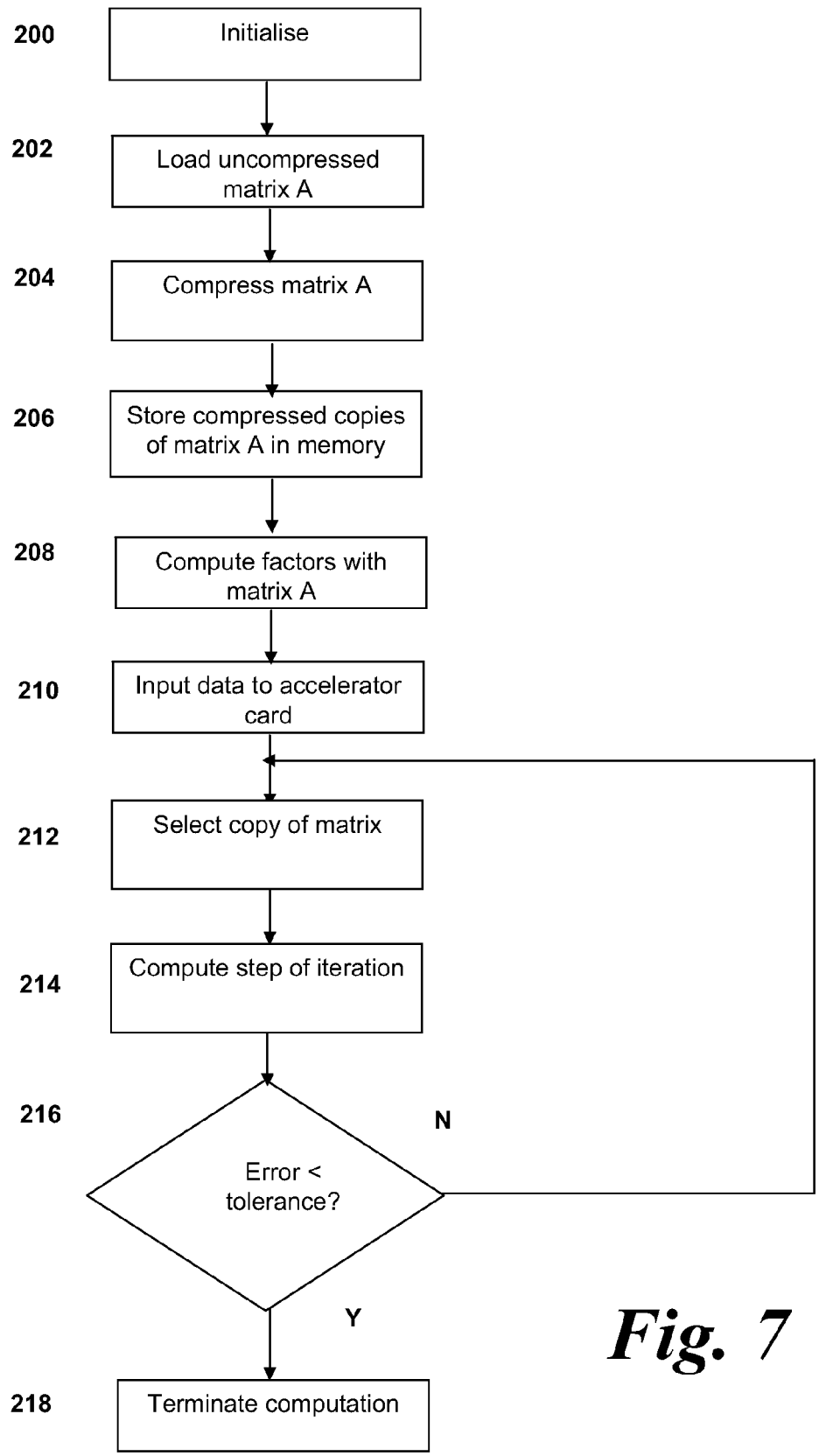
FIG. 7 is a schematic showing the operation of the computing device of FIG. 1.
Figure 8:
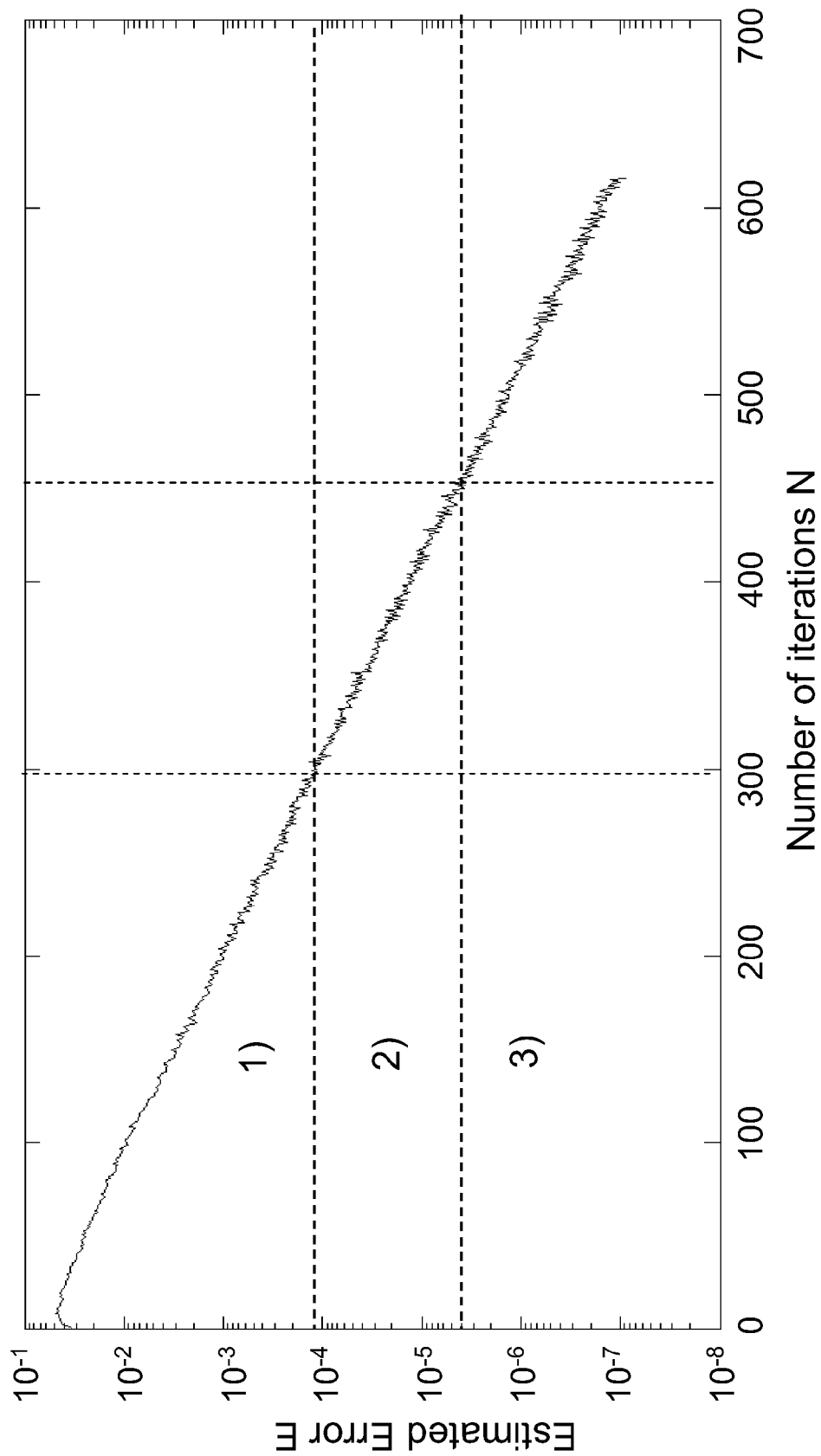
FIG. 8 is a graph showing the estimated error (on the Y-axis) as a function of the number of iterations (on the X-axis) during a typical calculation performed on the computing device of FIG. 1.

A method according to an embodiment of the invention will now be described with reference to FIGS. 7 and 8. FIG. 7 shows a method of operation according to an embodiment of the invention. FIG. 8 shows a graph of the estimated error in the iterative calculation (Y-axis) as a function of the number of iterations (on the X-axis).

The method and apparatus according to an embodiment of the invention is configured to perform iterative numerical calculations. Iterative computations are split into a large (typically in the range of 100 to 10000) number of steps. Each step usually corresponds to the same or similar calculation.

One application of the method and apparatus of the described embodiment is performing numerical calculations modelling fluid flow in deforming saturated oil reservoirs. Such reservoir modelling can be done by solving partial differential equations using the finite element method.

Reservoir modelling involves solving a fully coupled set of governing equations for multiple fluids flowing through a porous medium. The finite element method is applied to solve the resulting partial differential equations where displacement and fluid pressures are the primary unknowns. The finite element method involves forming a 3D mesh within the volume one wishes to model, and forming element matrices describing how each mesh-point relates to its neighbours using an approximation (often polynomial) of the governing equations. These element matrices are then combined in to a large sparse matrix and a corresponding vector to form a linear system. The solution of this linear system gives the solution at each point in the 3D mesh. For non-linear problems the vector forming the right-hand-side of the linear system is dependent upon the solution, and so the same linear system is solved multiple times with different right-hand-sides in order to find the final solution.

However, the skilled person would be readily aware of other numerical calculations which could be performed using the method and apparatus according to the invention.

Step 200: Initialise Computation

At step 200, the computation is started. At this point, the CPU 102 runs the program which initialises the iterative numerical computation.

This may be done by running a modelling program on the CPU 102 which inputs the initial conditions and any other data regarding the linear system to be solved.

The method then proceeds to step 202.

Step 202: Load Uncompressed Matrix

At this point, the CPU 102 retrieves the matrix A required for solving the linear equations for the finite element analysis. The matrix A is a sparse matrix and so only the non-zero values in the matrix A are utilised. However, the values in the matrix A have two components: the actual values A_DATA and position information A_POS relating to the position of the data values within the matrix A.

The size of the matrix A may be very large. For example, the number of rows and columns may each exceed a million, leading to an extremely large number of data values. Even with the CRS format, the number of data values A_DATA may be in excess of a million.

At this stage, neither the values A_DATA nor the position information A_POS is compressed. A_DATA comprises floating point values in double precision format. A_POS comprises position data indicating which row and column each data value in the set of data values A_DATA resides on.

The method then proceeds to step 204.

Step 204: Compress Matrix

The CPU 102 then compresses the matrix A. A number of compressions are performed, with each compression compressing the matrix A to give a copy of the matrix A, each copy having a different compression ratio.

At this stage, the position data A_POS and value data A_DATA are compressed differently. The position data can only be compressed with lossless compression and so the amount of compression which can be done on this data without generating errors is limited. Therefore, the position data A_POS is compressed losslessly to give compressed position data A'_POS and a compression ratio of approximately 10× can be achieved in this regard. For the position data (A_POS) a possible compression scheme is run-length encoding optionally including entropy encoding.

With regard to the value data A_DATA, lossy compression can be used. Therefore, a greater range of compression schemes and compression ratios are available. Some compression schemes may merely involve reducing the value data to a lower precision floating point representation with blocks of data sharing a single exponent. Alternatively, different compression schemes may be used.

In this embodiment, the CPU 102 compresses the position data A_DATA three times using different lossy compression ratios to give three compressed copies of the set of data A_DATA. The three copies are A'_DATA$_1$, A'_DATA$_2$ and A'_DATA$_3$ which correspond respectively to compressed matrices A'$_1$, A'$_2$ and A'$_3$.

A'_DATA$_1$ is the most highly compressed data set and is compressed with a compression ratio of 3.2×. A'_DATA$_2$ is the middle compression level with a compression ratio of 2.5×. A'_DATA$_3$ is the least compressed copy of the data set and is compressed by 2.0× when compared to the original, non-compressed data set.

The above compression levels are chosen so as to provide a suitable range of compression error during the iterative calculation. However, the skilled person would be readily aware that other compression ratios, compression schemes or number of compressed copies of the original set of data could be used.

The method then proceeds to step 206.

Step 206: Store Copies of Matrix in Accelerator Local Memory

Once the copies of the value data in the matrix A, A'_DATA$_1$, A'_DATA$_2$ and A'_DATA$_3$, each having a different compression ratio, are generated by the CPU 102, the copies of the data sets are then streamed across to accelerator card 110 over the data bus 106 to be stored in the onboard local memory 114 together with the compressed position data A'_POS.

The method then proceeds to step 208.

Step 208: Compute Factors with Matrix A

Initial vectors $r_0$, $p_0$ and scalar $\lambda_0$ for the conjugate gradient iterative method are computed on the CPU 102 in full double precision, and the data sent as inputs to the stream processor 112.

The computation of $r_0$, $p_0$ and $\lambda_0$ (the first three lines of the pseudo-code shown in equation 5)) is done in software on the CPU 102 prior to the remainder of the computation (the code inside the "for" loop as shown in equation 5)) being performed on the stream processor 112 in later stages. It is important that the matrix used to compute $r_0$ is the original uncompressed matrix A, otherwise the iterative calculation will not converge to the correct solution because the final solution will always be limited by the precision that was used for this computation of the initial values.

The method then proceeds to step 210.

Step 210: Send Factors to Accelerator Card

In step 210 the values calculated on step 208 are sent to the accelerator card 110 and stored in the local memory 114 to enable the iterative calculation to proceed.

The method then proceeds to step 212.

Step 212: Select Copy of the Matrix to Use

In step 212, a compressed copy of the matrix A stored in the local memory 114 is selected by the selecting unit 150. Therefore, one of the copies of the value data in the matrix A stored in the local memory 114, $A'\_DATA_1$, $A'\_DATA_2$ and $A'\_DATA_3$ is selected in this step.

Each copy of the value data $A'\_DATA_1$, $A'\_DATA_2$ and $A'\_DATA_3$ is stored with a different compression ratio. Therefore, since it is generally applicable that the higher the compression ratio, the greater the loss of precision in the dataset, it follows that a computation carried out using the value data stored with the highest compression ratio, $A'\_DATA_1$, will result in the greatest error in the final solution with respect to a calculation carried out using the full, uncompressed matrix A.

Following from that, a computation carried out using the less compressed value data set $A'\_DATA_2$ will have correspondingly reduced error and the value data set stored with the lowest compression ration, $A'\_DATA_3$, will have the lowest error.

Therefore, it is possible to set an error tolerance $T_i$ (where i=1, 2, 3) for each copy of the data set $A'\_DATA_i$, which corresponds to the level of compression used in that particular data set. This error tolerance is chosen based on the minimum level of error that can be achieved with a given compression scheme and/or compression ratio. Indeed, the compression scheme and/or ratio used for each copy of the data set $A'\_DATA_1$, $A'\_DATA_2$ and $A'\_DATA_3$ may be chosen to achieve a determined minimum error tolerance $T_i$.

This error tolerance $T_i$ can then be compared in step 212 with the estimated error E for a particular step of the iteration to determine which copy of the matrix data should be used in the calculation of that step. The estimated error E can be calculated in any number of ways, although in this embodiment the estimated error E corresponds to the 2-norm of the residual vector r.

A threshold value can then be set which corresponds to the error tolerance $T_i$ of each compressed copy of the matrix stored in the local memory 114. This is illustrated in FIG. 8 shows a graph of the estimated error E in the iterative calculation (Y-axis) as a function of the number of iterations N (on the X-axis).

As the iterative calculation progresses, the intermediate result from each step of the calculation will approach the final solution to the vector x and the estimated error E will gradually decrease. Based on the estimated error, at step 212, the appropriate compressed copy of the matrix A can be selected.

The estimated error E will always be highest at the start of the iterative calculation (i.e. for the early steps). Therefore, the most highly compressed matrix copy, $A'_1$ (including the most highly compressed value data $A'\_DATA_1$) is used for the initial steps. Since this copy of the matrix A is the most highly compressed, it has the lowest data volume. Hence, calculation speed improvements resulting from the reduced demands on memory bandwidth are the greatest for this matrix copy and the initial steps of the iteration can be completed quickly.

As shown in FIG. 8, region 1) corresponds to the region in which the copy $A'_1$ (including value data $A'\_DATA_1$) of the original, uncompressed matrix A is selected. In region 1), the estimated error E is higher than the error tolerance $T_1$ of the most highly compressed copy of the matrix data, $A'_1$ (including the most highly compressed value data $A'\_DATA_1$) and so this copy is selected for each step having an estimated error E in this region.

Once the estimated error E for a given step reaches the error tolerance $T_1$ of the matrix copy $A'\_DATA_1$, then the copy of the matrix having intermediate compression, $A'\_DATA_2$, is selected. This copy of the matrix will continue to be selected in step 212 whilst the estimated error remains in region 2) shown in FIG. 8, i.e. until the estimated error E for a given step reaches the error threshold $T_2$.

At this point, the least compressed matrix copy, $A'_3$ (including the least compressed set of value data $A'\_DATA_3$), will be selected in step 212 (i.e. when the estimated error E is in region 3) as shown in FIG. 8). This copy will be selected for subsequent steps until the estimated error reaches a given minimum value $E_{min}$. This will be described with reference to step 216.

Whilst, as shown in FIG. 8, the estimated error E does not decrease monotonically (there are localised variations and increases), it is known from the conjugate gradient method that the real error (which is not measurable as the exact solution is not yet known) is always decreasing.

Therefore, once the estimated error E drops below a given threshold for a particular copy of the matrix, $T_i$, even if the estimated error E increases briefly, a more highly compressed matrix will not be selected. In other words, once a more precise compressed matrix has been selected at step 212, a less precise matrix will not be selected in subsequent steps.

Once the appropriate compressed copy of the matrix A has been selected, the method then progresses to step 214.

Step 214: Compute Step of Iteration

In step 214, the stream processor 112 first decompresses the matrix value and position data in the decompression unit 160 to retrieve an uncompressed copy of the matrix $A_i$ (where i=1, 2 or 3 depending upon the compressed copy of the matrix selected in step 212). The stream processor 112 then executes a step of the iterative solve. The selected data, including the decompressed matrix $A_i$ is passed through the pipelined computational datapath 134 within the stream processor 112.

The computation is executed in approximately the same amount of time as it takes to "stream" the data through the computational datapath 134 on stream processor 112. This is because the computation happens as the data moves through the pipelined computational datapath 134. It is, of course, possible to add additional computation to the datapath without affecting the speed of computation, provided there is spare silicon area. The computational datapath 134 is determined by the appropriate programming of the stream processor 112 prior to use, as shown in the example given in FIG. 4.

The method then proceeds to step 216.

Step 216: Error<Tolerance?

At step 216, it is determined whether the estimated error E has reached, or dropped below, a minimum threshold error $E_{min}$. The minimum threshold error $E_{min}$ is the error at which the iteration has been deemed to have converged on a solution to an acceptable degree of accuracy. A typical value for the estimated error which may be deemed acceptable may be at or below $1 \times 10^{-7}$. At this point, a suitably accurate solution to the linear system has been deemed to have been found. If the estimated error E is less than the minimum threshold error $E_{min}$, then the method proceeds to step 218.

However, if more steps of the iteration are required, then the method proceeds back to step 212 and the process of selecting the appropriate compressed copy of the matrix continues.

Step 218: Terminate Calculation

At step 218, the minimum threshold error $E_{min}$ is deemed to have been achieved and the iterative solver has converged on a solution to an acceptable level. At this point, the solution obtained is streamed back to the CPU 102.

Optionally, at this point, the CPU 102 may perform one final step of the iteration using the original, uncompressed matrix A to check that the algorithm has indeed converged to a solution. Alternatively, the full, uncompressed matrix A could be streamed to the stream processor 112 and the final iteration could be performed on the FPGA stream processor 112 using the uncompressed matrix, if desired.

Variations of the above embodiments will be apparent to the skilled person. The precise configuration of hardware and software components may differ and still fall within the scope of embodiments of the invention. For example, whilst an embodiment of the invention has been described with reference to FPGA architecture, this need not be so. ASIC architecture, or any other processor type may be used.

Further, the accelerator need not be located on a card attached to a bus. The accelerator may, indeed, in some embodiments form part of a CPU or other processor within a computing system, or may be located on a motherboard with the CPU. Additionally, as discussed, multiple accelerator cards may be provided. Each card may be connected in parallel or in series and may be capable of communicating with the CPU or with other cards via the data bus or other connection.

Whilst the above embodiment has been described with reference to an FPGA stream processor arrangement, the skilled person would be readily aware of alternative configurations which could be used. For example, a CPU architecture with corresponding local memory could be used. Many CPUs are able to process operations in both single and double precision formats. Therefore, in this example, the multiple copies of data may comprise data in single and double precision formats.

Embodiments of the invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the invention.

The invention claimed is:

1. A method of processing a computation on a computing device comprising at least one processor and a memory, the method comprising:
   generating plural compressed copies of an original set of data; each compressed copy of the original set of data having a different compression ratio or compression scheme;
   storing, in said memory, said plural copies of the original set of data;
   selecting one of said plural compressed copies of said set of data;
   decompressing said selected compressed copy of said original set of data on a processor; and
   performing, on said at least one processor, the computation using said selected decompressed set of data.

2. A method according to claim 1, wherein said computation is an iterative calculation and the method further comprises, subsequent to said performing;
   repeating the steps of selecting and performing for further steps of said iterative calculation.

3. A method according to claim 1, wherein said compressed copy of the original set of data is selected in dependence upon the compression ratio and/or compression scheme of said compressed copy.

4. A method according to claim 2, wherein said compressed copy of the original set of data is selected in dependence upon the estimated error in said step of the iterative calculation.

5. A method according to claim 4, wherein said selecting comprises comparing the estimated error in said step of the iterative calculation with an error threshold for each compressed copy of the original set of data stored in said memory.

6. A method as claimed in claim 5, wherein said selecting further comprises selecting the compressed copy of the original set of data having an error threshold which is less than or equal to the estimated error in said step of the iterative calculation.

7. A method according to claim 5, wherein the error threshold for each compressed copy of the original set of data is a function of the compression ratio and/or the compression scheme of that copy.

8. A method according to claim 1, wherein said computing device comprises a central processing unit and a further processor, said step of decompressing being performed by said further processor.

9. A method according to claim 8, wherein said further processor is a stream processor and said memory is local to said stream processor.

10. A method according to claim 9, wherein said stream processor comprises an FPGA.

11. A method according to claim 1, wherein said original set of data is an uncompressed set of data.

12. A method according to claim 1, wherein said computing device comprises a central processing unit and a further processor, said step of generating being carried out by said central processing unit.

13. A method according to claim 1, wherein said set of data comprises a matrix.

14. A method according to claim 2, wherein said iterative calculation is a linear system solver.

15. A method according to claim 1, wherein said computing device comprises a central processing unit and a stream processor, said memory being local to said stream processor and said step of performing being carried out by said stream processor.

16. A computing device comprising:
   at least one processor operable to perform a computation on a set of data values and a memory operable to store said data values,
   wherein plural compressed copies of an original set of data are generated, each compressed copy of said original set of data having a different compression ratio or compression scheme, said plural compressed copies of said original set of data being stored in said memory, said at least one processor being further operable to select a compressed copy of the original set of data for performing said computation.

17. A computing device according to claim 16, wherein said computation is an iterative calculation and said at least one processor is further operable to repeat the steps of selecting and performing for further steps of said iterative calculation.

18. A computing device according to claim 17, wherein said at least one processor is further operable to select said compressed copy of said original set of data in dependence upon the compression ratio of said copy.

19. A computing device according to claim 16, wherein said at least one processor is further operable to select said compressed copy of said original set of data in dependence upon the estimated error in said step of the iterative calculation.

20. A computing device according to claim 19, wherein said at least one processor is further operable to select said compressed copy of said original set of data by comparing the estimated error in said step of the iterative calculation with an error threshold for each compressed copy of the set of original data stored in said memory.

21. A computing device according to claim 20, wherein said at least one processor is further operable to select said compressed copy of said original set of data by selecting a compressed copy of the original set of data having an error threshold which is less than or equal to the estimated error in said step of the iterative calculation.

22. A computing device according to claim 20, wherein the error threshold for each compressed copy of the original set of data is a function of the compression ratio of that compressed copy.

23. A computing device according to claim 16, wherein said at least one processor is further operable to generate, from an original set of data, said plural compressed copies of said original set of data.

24. A computing device according to claim 23, comprising a central processing unit and a further processor, said central processing unit being operable to generate said plural copies of said on original set of data.

25. A computing device according to claim 16, wherein said at least one processor is further operable to decompress said set of compressed data prior to performing said computation.

26. A computing device according to claim 25, wherein said computing device comprises a central processing unit and a further processor operable to decompress said set of compressed data.

27. A computing device according to claim 26, wherein said further processor is a stream processor and said memory is local to said stream processor.

28. A computing device according to claim 27, wherein said stream processor comprises an FPGA.

29. A computing device according to claim 16, wherein said computing device comprises a central processing unit and a stream processor operable to perform said computation, said memory being local to said stream processor.

30. A computing device according to claim 16, wherein said original set of data is an uncompressed set of data.

31. A computing device according to claim 16, wherein said original set of data comprises a matrix.

32. A computing device according to claim 17, wherein said iterative calculation is a linear system solver.

33. A non-transitory computer-readable storage medium having a computer program product stored thereon executable by a programmable processing apparatus, comprising one or more software portions for performing the steps of claim 1.

34. A method of processing a computation on a computing device comprising at least one processor and a memory, the method comprising:
    generating plural compressed copies of an original set of data, each compressed copy of the original set of data having a different compression ratio and/or compression scheme;
    storing, in said memory, said plural compressed copies of the original set of data, each copy of said set of data having a different compression ratio and/or compression scheme;
    decompressing one compressed of said set of data, on processor; and
    performing, on a processor, the computation using said one decompressed copy of said set of data.

35. A method according to claim 34, wherein said computation is an iterative calculation and the method further comprises, subsequent to said performing;
    repeating the step of performing for further steps of said iterative calculation.

36. A method according to claim 35, further comprising, switching to a different compressed copy of said set of data after a predetermined number of steps.

37. A method according to claim 36, wherein said switching comprises switching to a compressed copy of the original set of data having a lower compression ratio and/or lower data loss.

* * * * *